United States Patent Office 3,471,575
Patented Oct. 7, 1969

3,471,575
CATALYTIC HYDROGENATION OF α,β-UNSATURATED CARBONYL COMPOUNDS, UNSATURATED FATTY ACIDS, AND UNSATURATED FATTY ACID ESTERS
Shiro Kudo, 46, 1-cho, Kitashimizucho, Seiichi Yada, 15, 1-cho, Minamimikunigaoka-cho, and Takayoshi Yamauchi, 52, 4-cho, Ichijodori, all of Sakai-shi, Japan
No Drawing. Application June 23, 1965, Ser. No. 466,435, which is a continuation-in-part of application Ser. No. 340,485, Jan. 27, 1964, which in turn is a continuation-in-part of application Ser. No. 223,249, Sept. 12, 1962. Divided and this application Oct. 28, 1966, Ser. No. 605,113
Claims priority, application Japan, Sept. 22, 1964, 39/53,896
Int. Cl. C07c 29/14, 33/02; B01j 11/06
U.S. Cl. 260—617                                                        8 Claims

ABSTRACT OF THE DISCLOSURE

α,β-Unsaturated carbonyl compounds, unsaturated fatty acids and unsaturated fatty acid esters are selectively hydrogenated to unsaturated alcohols with the aid of a ternary Raney type catalyst comprising copper and cadmium.

---

This application is a division of copending application, Serial Number 466,435, filed June 23, 1965, which is a continuation-in-part of copending application Serial No. 340,485, filed January 27, 1964 (now abandoned), which is in turn a continuation-in-part of application Serial No. 223,249, filed September 12, 1962, and now abandoned.

The present invention embodies two aspects, both involving new catalysts, their production, and their use.

In the first aspect, the catalyst is a Raney copper cadmium catalyst prepared from a ternary alloy of about 30 to 60 percent by weight of aluminum and the remainder copper and cadmium. The cadmium content is about 4 to 15 percent by weight of said remainder, and the copper content is about 96 to 85 percent by weight of said remainder.

In the second aspect, the catalyst is a Raney copper cadmium catalyst prepared from a ternary alloy of about 30 to 60 percent by weight of aluminum, the remainder being copper and cadmium. The cadmium content is about 1 to slightly less than 4 percent by weight of said remainder, and the copper content is from a little more than 96 to about 99 percent by weight of said remainder.

Said catalysts are used in the production of α,β-unsaturated alcohols by hydrogenating α,β-unsaturated aldehydes and by hydrogenating α,β-unsaturated ketones. Said catalysts are also useful in the production of unsaturated higher aliphatic alcohols by hydrogenating either unsaturated fatty acids or unsaturated fatty acid esters.

In hydrogenating α,β-unsaturated aldehydes and ketones using an ordinary hydrogenation catalyst, it is very difficult to produce the corresponding unsaturated alcohol in a satisfactory yield, since the double bond in the unsaturated aldehyde or ketone is more easily hydrogenated than the carbonyl group.

The present catalysts are hydrogenation catalysts which have a high degree of specificity and which permit the production of α,β-unsaturated alcohols from α,β-unsaturated carbonyl compounds through selective hydrogenation with a high yield.

An object of this invention is the catalytic hydrogenation of unsaturated fatty acids and of unsaturated fatty acid esters to produce unsaturated higher aliphatic alcohols. It is also an object of this invention to conduct the hydrogenation in an economically feasible manner with small amounts of catalysts. A still further object of the invention is to employ a catalyst which can be easily and essentially completely separated from the alcohols produced and which can be effectively reused without revitalization.

Other objects are apparent from the following description.

The invention, in the first aspect, involves a method for preparing a catalyst used for the production of α,β-unsaturated alcohols by hydrogenation of α,β-unsaturated carbonyl compounds in gaseous phase, which comprises melting a mixture of aluminum, copper and cadmium containing 30 to 60% by weight of aluminum, and the remainder of copper and cadmium, the proportion of cadmium in the remainder being 4 to 15% by weight, to form a molten ternary alloy, rapidly cooling and then pulverizing said alloy, treating said pulverized alloy with an aqueous alkali solution, washing said alloy with water and removing the resultant Raney copper cadmium catalyst composition. A catalyst composition is obtained which is effective in the hydrogenation process of this invention. It is highly selective and will accomplish the objects of the invention. The selectivity of the catalysts may be increased as well as the yield of unsaturated alcohol by an additional treatment. This treatment comprises heating said catalyst at a temperature from 250° to 350° C. under a hydrogen gas stream or in an inert atmosphere.

The resultant catalyst composition is a Raney copper cadmium catalyst which possesses a high degree of selectivity. It is composed essentially of 1 to 50 percent by weight of aluminum and a remainder of cadmium and copper with cadmium being 4 to 15 percent by weight of this remainder. The surface area of the catalysts ranges from 5 to 70 square meters per gram ($m.^2/g.$). The composition which is preferred is that which is prepared from ternary alloy containing 40 to 50 percent by weight (wt. percent) of aluminum, 3 to 7 wt. percent cadmium and 43 to 57 wt. percent copper.

The invention, in the second aspect, involves a method for preparing a catalyst useful for producing α,β-unsaturated alcohols by hydrogenating α,β-unsaturated aldehydes and/or ketones. Said catalyst is also useful in the production of unsaturated higher aliphatic alcohols by hydrogenating either unsaturated fatty acids or unsaturated fatty acid esters.

The method described supra is also used for the preparation of the second catalyst except that the starting mixture contains from 30 to 70% by weight of aluminum, the remainder being cadmium and copper. The cadmium content is about 1 to less than 4% by weight of said reaminder and the copper conteint is from a little more than 96 to about 99% by weight of said remainder. After melting this mixture, to form a molten ternary alloy, rapidly cooling and then pulverizing said alloy, treating said pulverized alloy with an aqueous alkali solution, washing said alloy with water, there is formed a Raney copper cadmium catalyst composition containing 1 to 60 percent by weight of aluminum and remainder of cadmium and copper, with cadmium being 1 to less than 4 percent by weight of this remainder. The surface area of the catalyst ranges from 5 to 70 square meters per gram ($m.^2/g.$).

German Patent No. 858,247 mentions a method of carrying out a hydrogenation reaction by use of a metal capable of hydrogenation (for example, copper, nickel and iron) along with cadmium. In this method, cadmium and other metals capable of hydrogenation (for example copper) are used after coverting their nitrate or acetate to hydroxide by an alkali, followed by calcination and reduction, or after mixing cadmium hydroxide with the metal in oxide form, followed by calcination and reduction. This patent recommends a reaction pressure higher than 20 atmospheres, particularly from 100 to 300 atmospheres.

U.S. Patent No. 2,763,696 discloses another method of carrying out the reaction. In this method a precipitated catalyst prepared from cadmium and a metal belonging to the copper group is used. The reaction temperature ranges from 210° to 280° C., and the reaction pressure from 20 to 50 atmospheres.

Although catalysts prepared from cadmium, combined with metals having hydrogenating ability, may have selectivity in this reaction, prior art catalysts as disclosed in the above-noted patents have unavoidable disadvantages in that the hydrogenation is conducted at high temperatures and at high pressures because of the insufficient activity of the catalysts.

The present catalysts make possible the desired hydrogenation at ordinary pressure, i.e. at about atmospheric pressure, and at a lower reaction temperature than known catalysts. It can be seen from the examples that suitable hydrogenation temperatures range from about 125 to 280° C. These catalysts are prepared from an aluminum-copper-cadmium ternary alloy by treating with an alkali as set forth above.

By additionally heat-treating the Raney copper cadmium catalysts of this invention at a prescribed temperature, the selectivity of the catalysts is increased. The heat-treated catalysts give a remarkably increased yield of unsaturated alcohols, but give a little lower conversion of the reaction, as compared with the merely alkali-treated catalyst. However, yield and conversion of the catalysts of the invention are much higher than those of known catalysts, as seen in the examples.

The Raney copper cadmium catalysts of the invention are prepared, for example, as follows. Melting the alloy may be effected in a graphite crucible using an electro-furnace. For easier preparation of the ternary alloy of a definite composition, it is convenient preliminarily to prepare binary alloys of aluminum-copper and cadmium-copper of definite compositions, and then to fuse these molten alloys together to make the ternary alloy. The molten alloy is well agitated with a silica rod, poured out from the graphite crucible onto a floor to form a plate 2 to 3 mm. thick, cooled by water, and crushed to 2 to 3 mm. particles.

The alloy particles are treated with an aqueous alkali solution, such as sodium or potassium hydroxide solution, washed with water, heated, and then used for the hydrogenation. Upon the alkali-treatment, a greater part of the aluminum is dissolved out, as in the alkali treatment of usual Raney-type catalyst.

The heat-treatment to increase the selectivity of the catalysts of the invention is effected at a temperature of from 250° to 350° C., preferably from 270° to 300° C., under a hydrogen stream. The heat-treatment under an inert gas, such as nitrogen, has a similar effect on activity and selectivity.

The catalysts prepared according to the method above described are used for the gaseous phase selective hydrogenation of $\alpha,\beta$-unsaturated carbonyl compounds to $\alpha,\beta$-unsaturated alcohols. Particularly, the catalysts are suitable for the hydrogenation of $\alpha,\beta$-unsaturated carbonyl compounds having 3 to 12 carbons, especially 3 to 8 carbons, to the corresponding $\alpha,\beta$-unsaturated alcohols. Examples of the $\alpha,\beta$-unsaturated carbonyl compounds are acrolein, crotonaldehyde, $\alpha$-methylacrolein, 2-ethyl-penten-2-al-1, 2-ethyl-hexen-2-al-1, mesityl oxide, methyl vinyl ketone, methyl propenyl ketone, methyl isopropenyl ketone, methyl pentenyl ketone, and the like, which yield allyl alcohol, crotyl alcohol, 2-methyl-propen-2-ol-1, 2-ethyl-penten-2-ol-1, 2-ethyl-hexen-2-ol-1, 2-methyl-penten-2-ol-4, buten-1-ol-3, penten-2-ol-4, 2-methyl-buten-1-ol-3, hepten-3-ol-2, and the like, respectively.

The method of the invention is more fully described with reference to the working examples. The reaction tube employed for the hydrogenation in the examples is 18 mm. (millimeters) inner diameter and 400 mm. length, the middle portion of which is filled with 20 cc. (cubic centimeters) of catalyst. In Examples 1 to 8 vaporized $\alpha,\beta$-unsaturated aldehyde or ketone and hydrogen are supplied from the top of the reaction tube at a mol ratio of 1:12. The composition of the collected reaction product is determined by combination of gas chromatography and chemical analysis. The melting process of alloys in Examples 2 through 8 is similar to that mentioned in Example 1. The condition and processes of alkali-treatment and washing of the catalyst after the treatment, and way of catalyst filling, in Examples 2 through 8, are wholly the same as in Example 1. The term, "conversion," used in the examples means percentage of $\alpha,\beta$-unsaturated aldehyde or ketone converted to other substance, based upon the same charged to the reaction tube. The term, "yield," means percentage of objective $\alpha,\beta$-unsaturated alcohol based upon the $\alpha,\beta$-unsaturated aldehyde or ketone converted to other substance. The term, "L. S. V.," namely, "liquid space velocity," means volume at 20° C., of $\alpha,\beta$-unsaturated aldehyde or ketone supplied to a unit volume of catalysts per hour. The alloy composition is expressed by weight ratio. The reaction temperature is indicated in degrees centigrade and the reaction pressure in absolute kg./cm.$^2$.

EXAMPLE 1

Melt 176 g. (grams) of binary alloy block of aluminum-copper (40:48 by weight) in a No. 2 graphite crucible heated to about 700° C. by an electro-furnace. Add 24 g. of binary alloy block of cadmium-copper (1:1 by weight) thereinto under agitation. Agitate the resulting molten alloy well with a silica rod and pour out onto a floor to make a plate of 2 to 3 mm. (millimeters) thickness. Cool said alloy rapidly with water. After cooling, crush the alloy into 2 to 3 mm. particles.

Submerge fifty grams of the alloy in 1 kg. (kilogram) of aqueous 5% caustic soda solution at 100° to 101° C. for 2 hours, whereby a greater part of the aluminum in the alloy is dissolved out. After removal of the alkali solution, continually wash the alloy with 3 liters of water under a hydrogen stream of 50 to 100 mm. Hg, and then fill a reaction tube with the catalyst from the top under a hydrogen stream.

The following Table 1 shows the results of hydrogenation of crotonaldehyde by use of the resulting catalyst, and those by use of catalyst obtained by heat-treatment of the filled catalyst at 275° C. under a hydrogen stream for 3 hours.

TABLE 1

| Alloy composition Cu:Cd:Al (wt. percent) | Catalyst Composition Cu:Cd:Al (wt. percent) | Surface area, m.²/g. | Treatment | Reaction pressure, kg./cm.² abs. | Reaction temperature, ° C. | Liquid space velocity, l./l. hr. | Conversion, percent | Yield, percent |
|---|---|---|---|---|---|---|---|---|
| 54.0:6.0:40.0 | 72.9:8.1:19.0 | 19.0 | 275° C., 3 hrs. under H₂ | 1 | 125 | 0.66 | 2.0 | 28.3 |
| | | | | 1 | 175 | 0.55 | 12.6 | 80.9 |
| | | | | 1 | 225 | 0.60 | 26.8 | 79.0 |
| | | 19.3 | Without heating | 1 | 125 | 0.60 | 35.3 | 15.0 |
| | | | | 1 | 175 | 0.58 | 48.9 | 32.3 |
| | | | | 1 | 225 | 0.54 | 55.6 | 59.8 |

EXAMPLE 2

In Table 2, the results of hydrogenation of crotonaldehyde are shown. Activities and selectivities of a Raney copper cadmium catalyst of the invention are compared with those of a binary precipitated catalyst of copper-cadmium on diatomaceous earth. The latter binary catalyst is prepared by a known method, namely: caustic soda is added to an aqueous solution containing copper nitrate and cadmium nitrate, thereby co-precipitating a copper hydroxide and cadmium hydroxide mixture, which is then mixed with the carrier, dried at 110° to 115° C., calcined at 400° C. for 4 hours in air, and reduced at 300° C. for 3 hours.

TABLE 2

| Catalyst | Reaction pressure, (kg./cm.² abs.) | Reaction temperature (° C.) | Liquid space velocity (l./l. hr.) | Conversion, percent | Yield, percent |
|---|---|---|---|---|---|
| Precipitated binary catalyst Cu:Cd:Diatm. earth, 53.3:18.7:28.0. | 1 | 175 | 0.63 | 2.9 | 26.6 |
|  | 1 | 225 | 0.63 | 8.2 | 76.0 |
|  | 5 | 175 | 0.53 | 12.0 | 70.2 |
|  | 5 | 225 | 0.58 | 31.7 | 73.4 |

| Ternary Alloy Cu:Cd:Al (wt. percent) | Catalyst Composition Cu:Cd:Al (wt. percent) | Surface area (m.²/g.) | | | | | |
|---|---|---|---|---|---|---|---|
| 47.2:7.0:45.8 | 76.2:11.3:12.5 [1] | 27.6 | 1 | 175 | 0.66 | 12.9 | 75.1 |
|  |  |  | 1 | 225 | 0.51 | 33.2 | 83.1 |
|  |  |  | 5 | 175 | 0.68 | 35.2 | 78.1 |
|  |  |  | 5 | 225 | 0.50 | 68.1 | 81.2 |

[1] Heated at 275° C. for 3 hrs. under $H_2$.

EXAMPLE 3

In Table 3, activities and selectivities of the copper-cadmium binary catalyst on diatomaceous earth, as prepared in Example 2, are compared with those of Raney copper cadmium catalysts in the hydrogenation of acrolein to allyl alcohol.

EXAMPLE 4

In Table 4, the influence of the heat-treating temperature on activity and selectivity of the catalyst is shown in the hydrogenation of crotonaldehyde to crotyl alcohol. The heat-treatments in this example are effected for 3 hours under a hydrogen stream.

TABLE 4

| Tesmany Alloy (wt. percent) Cu:Cd:Al | Catalyst Composition (wt. percent) Cu:Cd:Al | Catalyst Surface area, m.²/g. | Temperature of heat treatment, ° C. | Reaction pressure, kg./cm.² abs. | Reaction temperature, ° C. | Liquid space velocity, l./l. hr. | Conversion, percent | Yield, percent |
|---|---|---|---|---|---|---|---|---|
| 54.2:3.5:42.3 | 79.1:5.1:15.9 | 18.6 | 225 | 1 | 225 | 0.64 | 98.5 | 5.3 |
|  |  |  | 275 | 1 | 225 | 0.65 | 49.1 | 56.7 |
| 38.7:2.1:59.2 | 70.1:3.8:26.2 | 38.2 | 275 | 1 | 225 | 0.59 | 31.6 | 81.2 |
|  |  |  | 325 | 1 | 225 | 0.69 | 28.0 | 80.3 |

EXAMPLE 5

Although the employment of the Raney copper cadmium catalyst prepared from varied composition of the alloy in each example obviates the influence of the proportion of catalyst metals in the alloy to activity and selectivity of the catalyst, Table 5 further clarifies the results where the proportions of copper and cadmium are changed (at the constant amount of aluminum) in the alloy in the hydrogenation of crotonaldehyde to crotyl alcohol. Also, Table 5 reflects the use of a small proportion of aluminum in the catalyst.

TABLE 3

| Catalyst | Reaction pressure, kg./cm.² abs. | Reaction temperature, ° C. | Liquid space velocity, l./l. hr. | Conversion, percent | Yield, percent |
|---|---|---|---|---|---|
| Precipitated binary catalyst Cu:Cd:Diatm. earth 53.3:18.7:28.0. | 1 | 175 | 0.60 | 2.1 | 4.5 |
|  | 1 | 225 | 0.59 | 3.8 | 14.0 |

| Ternary Alloy Cu:Cd:Al | Catalyst Composition heated at 275° C. for 3 hrs. under $H_2$ Cu:Cd:Al (wt. percent) | Surface Area, m.²/g. | | | | | |
|---|---|---|---|---|---|---|---|
| 45.2:4.4:50.4 | 76.0:7.4:16.6 | 30.1 | 1 | 175 | 0.64 | 8.9 | 29.6 |
|  |  |  | 1 | 225 | 0.68 | 20.4 | 59.5 |
| 47.2:7.0:45.8 | 72.9:10.8:16.3 | 28.0 | 1 | 225 | 0.65 | 13.9 | 25.7 |
|  |  |  | 5 | 225 | 0.50 | 29.0 | 45.8 |
|  |  |  | 7 | 225 | 0.55 | 39.2 | 53.8 |

TABLE 5

| Alloy composition (wt. percent) Cu:Cd:Al | Catalyst Composition (wt. percent) Cu:Cd:Al | Catalyst Surface area, m.²/g. | Heat treatment | Reaction pressure, kg./cm.² | Reaction temperature, °C. | Liquid space velocity, l./l. hr. | Conversion, percent | Yield, percent |
|---|---|---|---|---|---|---|---|---|
| 45.9:4.1:50.0 | 76.1:6.8:17.2 | 30.1 | (¹) | 3 | 225 | 0.58 | 31.0 | 84.3 |
| 47.9:1.7:50.4 | 78.9:2.8:18.3 | 30.2 | (¹) | 3 | 225 | 0.70 | 98.0 | 9.1 |
| 43.4:6.2:50.4 | 72.1:10.3:17.7 | 31.0 | (¹) | 3 | 225 | 0.58 | 29.6 | 81.6 |
| 60.1:6.1:33.9 | 71.1:7.1:21.8 | 8.0 | (¹) | 3 | 225 | 0.60 | 32.1 | 78.8 |

¹ Heated at 275° C. 3 hrs. under $H_2$.

EXAMPLE 6

In Table 6, the heat-treatment under a hydrogen stream is compared with that under a nitrogen stream for the hydrogenation of crotonaldehyde to crotyl alcohol.

The production of unsaturated higher aliphatic alcohols by hydrogenation of fatty acids or fatty acid esters having unsaturated groups was reported by Sauer and Adkins in "J. Am. Chem. Soc.," vol. 59, page 1 (1937) and

TABLE 6

| Alloy composition (wt. percent) Cu:Cd:Al | Catalyst Composition (wt. percent) Cu:Cd:Al | Catalyst Surface Area, m.²/g. | Heat treatment | Reaction pressure, kg./cm.² abs.) | Reaction temperature, °C. | Liquid space velocity, l./l.hr.² | Conversion, percent | Yield, percent |
|---|---|---|---|---|---|---|---|---|
| 45.2:4.4:50.4 | 75.1:7.3:17.6 | 32.3 | 275° C., 3 hrs. $H_2$ | 1 | 225 | 0.60 | 36.0 | 82.4 |
|  |  |  | 275° C., 3 hrs. $N_2$ | 1 | 225 | 0.58 | 45.5 | 79.2 |

EXAMPLE 7

In Table 7, the results of the production of 2-ethyl-hexen-2-ol-1 by hydrogenation of 2-ethyl-hexen-2-al-1 using the present Raney catalyst are shown.

unsaturated higher aliphatic alcohols were obtained from unsaturated fatty acid esters by use of mixed metal oxide catalysts. The catalyst was employed in a large amount (about 50% by weight based on the starting material)

TABLE 7

| Alloy composition (wt. percent) Cu:Cd:Al | Catalyst Composition (wt. percent) Cu:Cd:Al | Catalyst Surface Area, m.²/g. | Heat treatment | Reaction pressure, kg./cm.² abs.) | Reaction temperature, °C. | Liquid space velocity, l./l.hr.² | Conversion, percent | Yield, percent |
|---|---|---|---|---|---|---|---|---|
| 47.2:7.0:45.8 | 71.5:10.6:17.9 | 26.0 | 275° C., 3 hrs. $H_2$ | 1 | 245 | 0.86 | 31.5 | 68.1 |
|  |  |  |  | 3 | 245 | 0.68 | 60.2 | 35.5 |

EXAMPLE 8

In Table 8, the results of the production of 2-methyl-penten-2-ol-4 by hydrogenation of mesityloxide using the present Raney catalyst are shown.

and the reaction time required was 7 to 11 hours. Much research has since been conducted on this kind of hydrogenation. Using metals other than copper as catalysts, the most detailed research is that of Komori, who com-

TABLE 8

| Alloy composition (wt. percent) Cu:Cd:Al | Catalyst Composition (wt. percent) Cu:Cd:Al | Catalyst Surface Area, m.²/g. | Heat treatment | Reaction pressure, kg./cm.² abs. | Reaction temperature, °C. | Liquid space velocity, l./l. hr. | Conversion, percent | Yield, percent |
|---|---|---|---|---|---|---|---|---|
| 50.9:5.1:44.0 | 74.9:7.5:17.6 | 21.0 | 275° C., 3 hrs. $H_2$ | 5 | 225 | 0.50 | 56.0 | 37.4 |
|  |  |  |  | 3 | 275 | 0.55 | 40.2 | 36.1 |

The catalyst of this invention also exhibits excellent activity and selectivity in the production of unsaturated higher aliphatic alcohols by hydrogenation of unsaturated fatty acids or unsaturated fatty acid esters, and has prominent properties as an industrial catalyst in view of the catalyst life and the easy recovery from reaction products.

Also according to the present invention unsaturated higher, e.g. $C_{12}$ to $C_{20}$, aliphatic alcohols are produced economically and in high yield from fatty acids or fatty acid esters having ethylenically unsaturated groups, utilizing the excellent properties of the afore-said catalyst as an industrial catalyst.

pared catalyst abilities of various mixed metal oxide catalysts and observed that particularly effective catalysts are zinc-chromium oxide ["Kogyo Kagaku Zasshi," vol. 41, page 419 (1938)] and iron-chromium oxide ["Kogyo Kagaku Zasshi," vol. 43, page 910 (1940)]. Sasazaki recognized that a zinc powder is also effective on this kind of hydrogenation ["Nihon Nogei Kagaku Kaishi," vol. 15, page 531 (1939)], and Kobashi et al. reported that zinc-aluminum oxides and iron-zinc oxides are excellent catalysts ["Kogyo Kagaku Kaishi," vol. 54, page 581 (1951)].

Regarding zinc-chromium binary catalysts, many results have been reported, in addition to those of Komori, in British Patent 806,619, "Masloboino-Zhirovaya Prom.," vol. 25, No. 10, page 25 (1959) and "Tr. Vses. Nauchn.-Issled. Inst. Zhirov," No. 20, page 216 (1960). Further, there are reports on zinc-vanadium and cadmium-vanadium binary catalysts (German Patent 865,741).

However, with prior catalysts it is ordinarily necessary to adopt reaction temperatures of from 300° to 330° C. in addition to using the catalyst in an amount of about 10 to 20% based on the weight of the reactants when the reaction is a catalyst-suspension type liquid phase reaction.

In Japanese Patent No. 136,030 a catalyst containing copper is used in producing unsaturated higher aliphatic alcohols from unsaturated fatty acids or esters thereof. The catalyst is supported on a carrier, such as diatomaceous earth, the copper and cadmium being converted into the form of hydroxides by alkali treatment of mineral acid salts thereof, and then washing and drying the resultant. As an example of using a copper-chromite catalyst in combination with cadmium, Lauer et al. reported the reduction of Egyptian cottonseed oil at 350° C., using 10% of a cadmium-modified copper chromite catalyst. ["Osterr. chem.-Ztg.," vol. 56, page 255 (1955).]

Also, Moreno et al. effected this kind of hydrogenation at 265° C. by using 10% copper-chomite catalyst in combination with 3.75% cadmium carbonate. ["Grasas y Aceites" (Seville, Spain), vol. 9, page 60 (1958)]. Dutch Patent 83,379 describes the preparation of unsaturated higher aliphatic alcohols from corresponding unsaturated fatty acids at reaction temperatures of 280° to 300° C. by using a catalyst comprising 60 to 90% of copper soap and 40 to 10% of cadmium soap. In addition, regarding the production of unsaturated higher aliphatic alcohols from unsaturated fatty acids by use of said copper-cadmium soap catalyst, the results of detailed research have been announced ["Chim. et Ind." (Paris), vol. 83, page 875 (1960)].

When this kind of hydrogenation is effected by use of a solid catalyst, there have conventionally been required a high temperature and a large amount of the catalyst based on the weight of the reactants. However, the reaction at high temperatures of fatty acids or fatty acid esters having unsaturated groups necessarily causes undesirable side reactions, such as the dehydration or polymerization of reactants, whereby the reaction yield is markedly lowered. Also, the use of a large amount of catalyst, based on the weight of reactants, is disadvantageous from an industrial point of view. Moreover, the metal oxide catalysts or supported catalysts are difficulty separable from reaction products, when used in catalyst-suspension-type liquid phase reactions. Great pains are required to recover the catalysts. Metallic soap catalysts appear to permit lower reaction temperatures and lesser amounts of catalyst, but suffer from many industrial drawbacks, since it is difficult to reuse them.

The present Raney copper cadmium catalyst makes possible the production of unsaturated higher aliphatic alcohols in high yields in an extremely short period at a reaction temperature of 250° to 280° C., even though the catalyst is employed, when a catalyst-suspension type liquid phase reaction is adopted, in as small an amount as 3 to 5% based on the weight of reactants. Also, said catalyst suffers little from lowering in activity by repeated use, as shown in Example 13, and further has excellent properties as an industrial catalyst in that, when used in a catalyst-suspension type liquid phase reaction, it is separable from the reaction product with extreme ease (see Example 14).

The present invention is further illustrated with reference to the following examples, wherein the analytical values of each reaction product are measured on substance obtained by thoroughly saponifying the product after the removal of the catalyst, treating the saponified product with hydrochloric acid, washing the treated substance with water and then topping the same under reduced pressure to remove methanol or butanol completely.

EXAMPLE 9

In an electric furnace, heat a graphite crucible to about 700° C. Melt 180 g. (grams) of an aluminum-copper (1:1 by weight ratio) binary alloy lump in the crucible. Subsequently, charge 20 g. of a cadmium-copper (1:1 by weight ratio) binary alloy lump in the crucible, while thoroughly stirring the content. Discharge the resulting alloy on a floor while stirring with a silica rod. Immediately cool said resulting alloy rapidly with water and crush into a grain size of 200 to 250 mesh. The resulting alloy has a composition (wt. percent Cu:Cd:Al) of 50.0:5.0:45.0. Submerge 10 g. of the thus obtained alloy grains in 1000 g. of 10% aqueous caustic soda solution at 30° C. for 15 minutes. Upon the alkali-treatment, most of the aluminum is dissolved out.

After the treatment, discard the alkali liquid and wash the thus obtained catalyst grains with water until the wash water is neutral. The resulting catalyst has a composition (wt. percent Cu:Cd:Al) of 88.0:8.6:3.2; and a surface area (m.$^2$/g.) of 25.0. Fill a quartz tube with the catalyst grains and heat said grains at 300° C. for 3 hours in a hydrogen current.

Add 3 g. of the above catalyst to 100 g. of methyl oleate (iodine number: 89.1; saponification value: 192.3; acid number: 0). Charge the resulting mixture in a shaking-type autoclave having an inner volume of 1 l. (liter). Shake in the autoclave for 120 minutes at 260° C. under an initial hydrogen pressure of 120 kg./cm.$^2$ (kilograms per square centimeter) at 20° C., and cool. The reaction product has an iodine number of 72.8, an acid number of 54.1 and a hydroxyl value of 160.0. The hydroxyl value is the weight (mg.) of caustic potassium required for neutralizing acetic acid formed by decomposing the acetylated product obtained by acetylating 1 g. of the sample.

EXAMPLE 10

Add 5 g. of the catalyst obtained by the method of Example 9 to 100 g. of butyl oleate (iodine number: 77.2; saponification value: 170.1; acid number: 0.8). React the resulting mixture in the autoclave of Example 9 at 260° C. for 150 minutes under an initial hydrogen pressure of 130 kg./cm.$^2$ at 20° C., and then cool. The reaction product has an iodine number of 75.0, an acid number of 55.2, and a hydroxyl value of 155.0.

EXAMPLE 11

The activity of butyl oleate of the present Raney catalyst is compared with that of a copper-cadmium binary catalyst carried by diatomaceous earth. The results are shown in Table 9.

The copper-cadmium binary catalyst carried by diatomaceous earth is prepared conventionally, i.e., by dissolving given amounts of copper nitrate and cadmium nitrate in water to form an aqueous solution, coprecipitating from said aqueous solution copper hydroxide and cadmium hydroxide by use of caustic soda, mixing said hydroxides with a carrier, drying the resulting mixture at 110° to 115° C., calcining the dried mixture in air at 400° C. for 4 hours, and then reducing the calcined mixture at 300° C. for 3 hours.

TABLE 9.—BUTYL OLEATE: ANALYTICAL VALUES=IODINE NUMBER: 77.2; SAPONIFICATION VALUE: 170.1; ACID NUMBER: 0.8; AMOUNT CHARGED: 100 g.

| Catalyst | Catalyst amount, g. | Reaction temperature, °C. | Reaction time, m.²n. | Initial hydrogen pressure at 26° C., kg./cm.² | Analytical value of reaction product | | |
|---|---|---|---|---|---|---|---|
| | | | | | Iodine number | Acid number | Hydroxyl value |
| Binary catalyst prepared by precipitating method (composition by wt. Cu:Cd:diatomaceous earth=53.3:18.7:28.0) | 10 | 260 | 150 | 100 | 86.9 | 165.1 | 40.3 |
| Raney catalyst shown in Example 9 | 10 | 260 | 150 | 100 | 75.4 | 57.8 | 153.1 |

The autoclave employed was the same as in Example 9.

EXAMPLE 12

By use of the catalyst obtained in Example 9, oleic acid, olive oil and methyl ester prepared from rice oil, respectively, are hydrogenated. The adopted reaction conditions and the obtained reaction products are summarized in Table 10.

said reaction product is removable with extreme ease merely by decantation.

The preceding examples were directed to the catalyst embodying the first aspect of this invention. The catalyst embodying the second aspect of this invention could also be used in the foregoing examples wherein the catalytic activity is set forth. The following examples are directed to the catalyst of the second aspect of this invention.

TABLE 10

| Feed | | Catalyst amount, g. | Reaction temperature, °C. | Reaction time, min. | Initial hydrogen pressure at 20° C., kg./cm.² | Analytical values of reaction product | | |
|---|---|---|---|---|---|---|---|---|
| Name and analytical | Charged amount, g. | | | | | Iodine number | Acid number | Hydroxyl value |
| Oleic acid: Iodine number, 71.2; Saponification value, 206.4; Acid number, 205.4 | 100 | 8 | 280 | 180 | 130 | 74.6 | 55.0 | 155.6 |
| Olive oil: Iodine number, 78.7; Saponification value, 192.1; Acid number, 2.5 | 100 | 10 | 260 | 150 | 120 | 71.5 | 87.2 | 120.9 |
| Rice oil methyl ester: Iodine number, 122.4; Saponification value, 189.4; Acid number, 0 | 100 | 5 | 250 | 100 | 120 | 78.1 | 61.3 | 149.2 |

The autoclave employed is the same as in Example 9.

EXAMPLE 13

The present Raney catalyst may be used repeatedly. Test results are shown in Table 11. The test is carried out as follows:

Add 5 g. of catalyst obtained in Example 9 to 100 g. of methyl oleate (iodine number: 89.1; saponification value: 192.3; acid number: 0). React the resulting mixture in the autoclave of Example 9 at 260° C. for 100 minutes under an initial hydrogen pressure of 100 kg./cm.² at 20° C. After the reaction, separate the catalyst from the reaction mixture and recharge the autoclave with the used catalyst and a fresh sample (100 g.) of the methyl oleate. Repeat the preceding reaction under the stated conditions. Repeat the same operations thereafter for a total of five times. All the reaction conditions after the second time are the same as those of the first time.

TABLE 11

| | Analytical value of reaction Product | | |
|---|---|---|---|
| | Iodine number | Acid number | Hydroxyl value |
| Time of repeated use: | | | |
| 1 | 73.2 | 49.6 | 162.0 |
| 2 | 74.0 | 51.7 | 159.1 |
| 3 | 73.1 | 50.3 | 160.8 |
| 4 | 72.4 | 52.0 | 156.3 |
| 5 | 74.0 | 53.8 | 155.1 |

EXAMPLE 14

In order to examine the degree of separation of catalyst from reaction product, remove the reaction product (obtained by the catalyst having been repeatedly used for three times in Example 13) from the autoclave and vigously stir again at 50° C. 2 minutes after the discontinuation of stirring, decant the supernatant. The amount of catalyst incorporated in said supernatant is 0.1 g. That is, 98% of the total amount (5 g. of catalyst) present in

EXAMPLE 15

A graphite crucible was heated at about a temperature of 700° C. in an electric furnace. 194 g. of two component alloy mass consisting of aluminum and copper in a proportion of 50:47 by weight were melted in this crucible. Then 6 g. of two component alloy mass consisting of cadmium and copper in a proportion of 1:1 by weight was introduced therein while stirring. While being stirred well by a bar of silica, the content was discharged on a floor, immediately cooled by water and after being cooled, crushed to 200 to 250 mesh.

10 g. of the resulting alloy was treated with 1 kg. of 10 percent aqueous solution of sodium hydroxide at a temperature of 30° C. for 15 minutes. After this treatment, the alkaline solution was discarded, and the alloy was washed with water until washed solution becomes neutral. The washed alloy was filled in a quartz tube and treated in a hydrogen atmosphere at a temperature of 290° C. for 3 hours.

5 g. of the above-mentioned catalyst as added to 100 g. of butyl oleate (iodine value 76.8, saponification value 168.2 and acid value 0.1). This mixture was charged in an autoclave having an internal volume of 1 liter and equipped with a stirrer and allowed to react at an initial hydrogen pressure of 130 kg./cm.² (at 20° C.), at a temperature of 265° C. for 150 minutes. The analytical values of the product formed were as follows: iodine value 70.3; acid value, 49.8; hydroxyl value 157.0. The hydroxyl value was expressed as milligrams of potassium hydroxide required to neutralize acetic acid produced by decomposing 1 gram of the acetylated product.

EXAMPLE 16

8 g. of the catalyst obtained in Example 15 was added to 100 g. of oleic acid (iodine value 72.0, saponification value 207.6 and acid value 205.5). The mixture was allowed to react in the autoclave of Example 15 at an initial hydrogen pressure of 140 kg./cm.² (at 20° C.) at a temperature of 280° C. for 150 minutes. The analytical values of the product measured after being taken out and treated as in Example 15 were as follows: iodine value, 68; acid value, 65.1; and hydroxyl value, 139.8.

EXAMPLE 17

198.4 g. of a two component alloy mass consisting of aluminum and copper in a proportion of 34:15.6 by weight and 1.6 g. of a two component alloy mass consisting of cadmium and copper in a proportion of 1:1 were melted in a crucible by the method set forth in Example 15, while being stirred well, discharged on a floor, immediately cooled by water and after being cooled, crushed into lumps of 3 to 5 millimeters.

50 g. of the crushed alloy was treated in 700 g. of 10 percent sodium hydroxide solution at a temperature ranging from 100° to 101° C. for 3 hours and washed sufficiently with water after discarding the alkaline solution. The treated alloy was added to the middle of a reaction tube made of SUS (trade name of a Japanese stainless steel manufacturer) and having an internal diameter of 18 mm. and length of 400 mm. and subjected to heat treatment at a temperature of 275° C. for 3 hours under a hydrogen atmosphere. The so-obtained catalyst was used for hydrogenation of 6-methyl-$\Delta^3$-tetrahydrobenzaldehyde. The results of this hydrogenation is shown in the following Table 12.

TABLE 12

| | Reaction pressure, kg./cm.² abs. | Reaction temperature, ° C. | Liquid space velocity, 1./1. hr. | Conversion, Percent | Yield, Percent |
|---|---|---|---|---|---|
| Experiment number: | | | | | |
| 1 | 5 | 280 | 0.6 | 69.4 | 93.6 |
| 2 | 5 | 300 | 0.3 | 86.4 | 81.3 |

The vapors of 6-methyl-$\Delta^3$-tetrahydrobenzaldehyde and hydrogen were fed from the top of the reaction tube in a mol ratio of 1:12. The composition of the product was calculated by simultaneous use of gas chromatography and chemical analysis. The conversion indicated in the table is the percentage by weight of 6-methyl-$\Delta^3$-tetrahydrobenzaldehyde converted to other substances to that fed to the reaction tube. Yield is the percentage by weight of 6-methyl-$\Delta^3$-tetrahydrobenzyl alcohol to converted substance.

Various changes may be made in the processes and in the catalysts without departing from the spirit or the scope of the invention or sacrificing its material advantages, the processes and catalysts hereinbefore described being merely illustrative of preferred embodiments of the invention.

What is claimed is:

1. A process for producing an unsaturated alcohol which comprises hydrogenating an aliphatic $\alpha,\beta$-unsaturated carbonyl compound selected from the group consisting of acrolein, crotonaldehyde, $\alpha$-methylacrolein, 2-ethyl-penten-2-al-1, 2-ethyl-hexen-2-al-1, mesityl oxide, methyl vinyl ketone, methyl propenyl ketone, methyl isopropenyl ketone, and methyl pentenyl ketone at a temperature of about 125 to 280° C. and about atmospheric pressure in the presence of a Raney copper-cadminm catalyst to produce the corresponding unsaturated alcohol selected from the group consisting of alkyl alcohol, crotyl alcohol, 2-methyl-propen-2-ol-1, 2-ethyl-penten-2-ol-1, 2-ethyl-hexen-2-ol-1, 2-methyl-penten-2-ol-4, buten-1-ol-3, penten-2-ol-4, 2-methyl-buten-1-ol-3, and hepten-3-ol-2, respectively, wherein the weight of the cadmium is 4 to about 15% of the sum of the weights of copper and cadmium.

2. The process of claim 1, wherein the surface area of the catalyst is about 5 to 70 square meters per gram.

3. A process for producing an unsaturated alcohol which comprises hydrogenating an aliphatic $\alpha,\beta$-unsaturated carbonyl compound selected from the group consisting of acrolein, crotonaldehyde, $\alpha$-methylacrolein, 2-ethyl-penten-2-al-1, 2-ethyl-hexen-2-al-1, mesityl oxide, methyl vinyl ketone, methyl propenyl ketone, methyl isopropenyl ketone, and methyl pentenyl ketone at a temperature of about 125 to 280° C. and about atmospheric pressure in the presence of a Raney copper-cadmium catalyst to produce the corresponding unsaturated alcohol selected from the group consisting of alkyl alcohol, crotyl alcohol, 2-methyl-propen-2-ol-1, 2-ethyl-penten-2-ol-1, 2-ethyl-hexen-2-ol-1, 2-methyl-penten-2-ol-4, buten-1-ol-3, penten-2-ol-4, 2-methyl-buten-1-ol-3, and hepten-3-ol-2, respectively, wherein the weight of the cadmium is about 1 to less than 4% of the sum of the weights of copper and cadmium.

4. A process for producing an unsaturated alcohol which comprises hydrogenating a raw material containing an unsaturated fatty acid or an unsaturated fatty acid ester selected from the group consisting of oleic acid, olive oil, the methyl ester of rice oil, methyl oleate and butyl oleate at a temperature of about 125 to 280° C. and about atmospheric pressure in the presence of a Raney copper-cadmium catalyst to produce the corresponding unsaturated alcohol wherein the weight of the cadmium is 4 to about 15% of the sum of the weights of copper and cadmium.

5. A process for producing an unsaturated alcohol which comprises hydrogenating 6-methyl-$\Delta^3$-tetrahydrobenzaldehyde at a temperature of about 125 to 280° C. and about atmospheric pressure in the presence of a Raney copper-cadmium catalyst to produce 6-methyl-$\Delta^3$-tetrahydrobenzyl alcohol wherein the weight of the cadmium is 4 to about 15% of the sum of the weight of copper and cadmium.

6. The process of claim 1 wherein the reaction temperature is about 250° to 280° C.

7. The process of claim 3 wherein the reaction temperature is about 250 to 280° C.

8. The process of claim 4 wherein the reaction temperature is about 250 to 280° C.

References Cited

UNITED STATES PATENTS

| 1,915,473 | 6/1933 | Raney | 260—690 |
| 2,094,117 | 9/1937 | Byrkit. | |
| 2,253,607 | 8/1941 | Boyd et al. | |
| 2,332,834 | 10/1943 | Schuckmann. | |
| 2,375,495 | 5/1945 | Richardson et al. | |
| 2,504,497 | 4/1950 | Charles et al. | |
| 2,604,455 | 7/1952 | Reynolds et al. | |
| 2,763,696 | 9/1956 | Finch et al. | |

FOREIGN PATENTS

| 479,642 | 2/1938 | Great Britain. |
| 611,987 | 11/1949 | Great Britain. |
| 641,986 | 5/1962 | Canada. |

LEON ZITVER, Primary Examiner

J. E. EVANS, Assistant Examiner

U.S. Cl. X.R.

252—475, 477; 260—638